March 29, 1960
A. A. SOUTHARD
2,930,141
GEOREF COMPUTER
Filed May 27, 1958
3 Sheets-Sheet 1
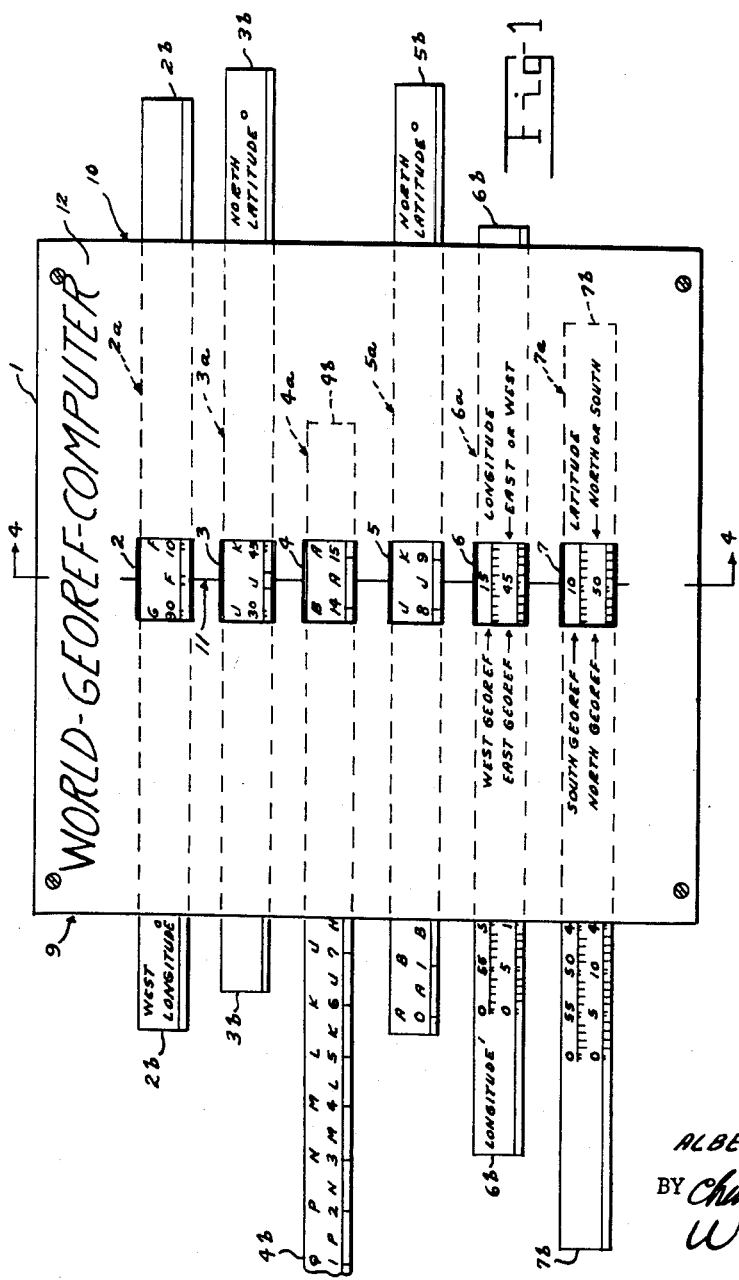
INVENTOR.
ALBERT A. SOUTHARD
BY
ATTORNEYS March 29, 1960     A. A. SOUTHARD     2,930,141
GEOREF COMPUTER
Filed May 27, 1958     3 Sheets-Sheet 2
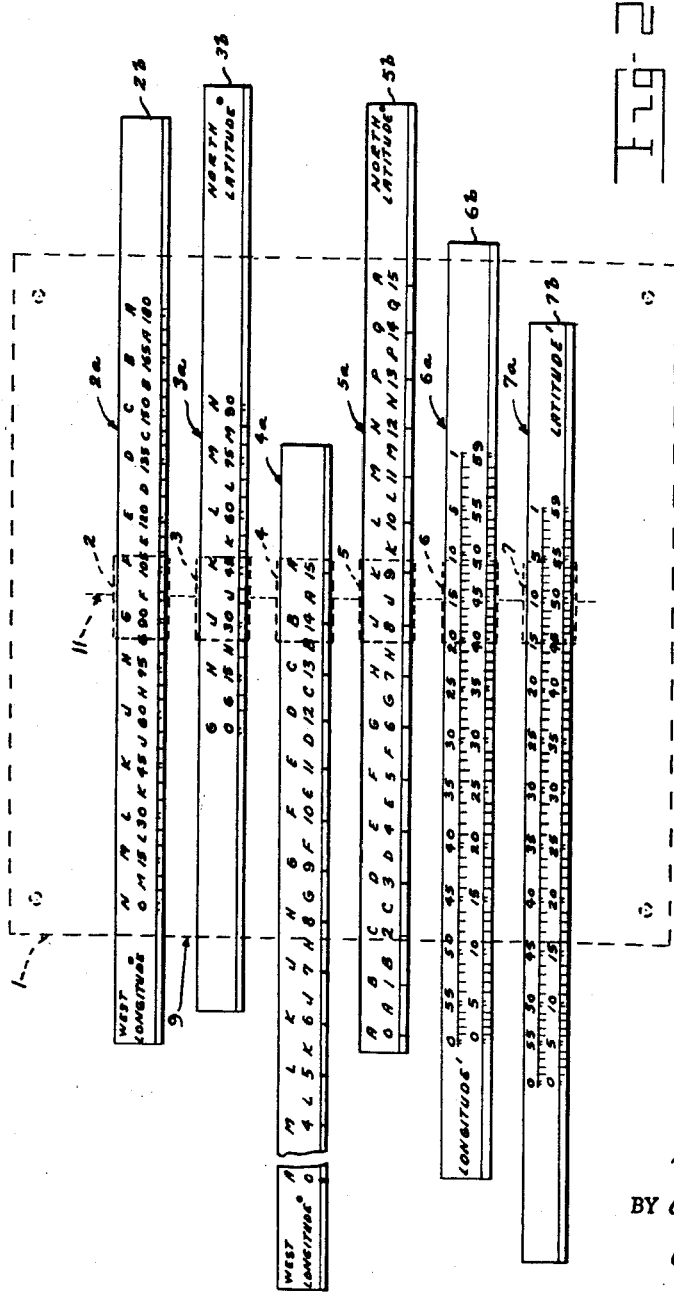
INVENTOR.
ALBERT A. SOUTHARD

INVENTOR.
ALBERT A. SOUTHARD

United States Patent Office 2,930,141
Patented Mar. 29, 1960

2,930,141

GEOREF COMPUTER

Albert A. Southard, Council Grove, Kans.

Application May 27, 1958, Serial No. 738,245

2 Claims. (Cl. 35—2)

(Granted under Title 35, U.S. Code (1952), sec. 266)

The invention described herein may be manufactured and used by or for the United States Government for governmental purposes without payment to me of any royalty thereon.

The invention relates to a geographical reference computer whereby the geographic coordinates of the world at any location thereof may be quickly and directly converted to geographical reference designations of another and well-known world-wide location determining system which is known as Georef designators by a simple, easy and very quick operation with minimum likelihood of error.

To provide a proper understanding of the Georef system, as it is called, and therefore a better understanding of the invention and its application solely to this system a brief description of the Georef system follows: The Georef system is a highly simplified method of designating geographic location of longitude and latitude, in a form suitable for very rapid plotting. The Georef system obviates the difficulties and confusion arising both from conventional longitude and latitude references and from the great complexity of rectangular grids in use over large areas by (military) ground forces. The system may be used with any graduated map or chart regardless of the type of projection and is based on a gradicule of meridians of longitude and parallels of latitude of which the prime meridian is that of Greenwich with a point of origin at the South Pole on the 180 meridian.

By the Georef system the surface of the earth is divided into quadrangles, the sides of which are specific arc lengths of longitude and latitude. Each quadrangle is identified by a systematic lettering code giving positive position identification with no risk of ambiguity.

The earth s divided into twenty-four longitudinal zones in the Georef system, each 15 degrees in width, that is, one hour in time each, extending eastward from the 180 meridian back to the 180 meridian. These 15° longitude zones are lettered A to Z inclusive, omitting the letters I and O.

There are 12 bands of latitude each of 15° depth extending northward from the South Pole to the North Pole. According to this Georef system this divides the earth's surface into 288 15° quadrangles each of which is identified by two letters, the first letter being that of the 15° longitude zone, and the second letter being that of the 15° latitude zone or band. For example, Colorado Springs, Colorado is located 104° 45′ West longitude and 38° 50′ North latitude and is located on the Georef system location in the FJ 15° quadrangle.

Each 15° quadrangle is subdivided into fifteen 1° zones of longitude eastward from the western meridian of the 15° quadrangle. These degrees are designated by letters A to Q inclusive, omitting letters I and O.

Each 15° quadrangle is also subdivided into fifteen 1° bands of latitude, always northward from the southern parallel of the 15° quadrangle. These subdivisions are also lettered northward A to Q, omitting I and O.

Accordingly a 1° quadrangle anywhere on the earth's surface can be identified by four letters; the first two letters denoting the specific 15° quadrangle and the third and fourth letters denoting respectively the 1° latitude zones northward from the southern parallel of the 15° quadrangle and the 1° longitude zones eastward from the western meridian of the 15° quadrangle.

Thus Colorado Springs, Colorado is written Georef as FJAJ (omitting the minutes).

Each 1° zone or quadrangle is further divided into 60 numbered minutes of longitude eastward from the western meridian of the 1° quadrangle or zone and also 60 numbered minutes of latitude measured northward from the southern parallel or border of the 1° quadrangle. The system of numbering and lettering is always consistent, northward from the South Pole and eastward from 180° meridian and the western meridians of the 15° and 1° quadrangles. Thus Colorado Springs, Colorado is referenced Georef as FJAF1550. Seoul, Korea would be WJGH5832 in the Georef system. For greater accuracy the minute quadrangles may each be subdivided into tenth of minute quadrangles in a similar manner and six numerals can be used to identify the longitude and latitude to a point to an accuracy of one tenth of a minute which is approximately 608 feet. This subdivision may progress further to obtain the accuracy desired.

Prior to the subject invention the conversion of longitude and latitude to the Georef system, and the reconversion of the Georef reference data to longitude and latitude has been somewhat cumbersome, tedious and time consuming, with considerate possibility of error during the conversion.

The present invention provides a very simple and easily operated converter or translator whereby direct and immediate conversion of geographical coordinates in longitude and latitude respectively east or west and north or south may be quickly converted with minimum likelihood of error to "Georef" location information and vice versa. This permits any standard chart or map carrying only the standard longitude and latitude coordinate grids to be used in plotting positions referenced by "Georef" designators and further eliminates any map or chart where only straight conversion is the problem, also the conversion process by the invention eliminates the need for tedious resection of reference points on a chart over-printed with both grids, as well as eliminating such errors to which such a system is subjected.

An object of the invention is to provide a new and novel converter unit which is easily manipulatable to obtain direct conversion of geographical longitude and latitude coordinates to Georef designators and vice versa.

Other objects and advantages of the invention will become apparent from the following description and accompanying drawing in which like reference characters refer to like parts in the several figures.

Figure 1 is a plan view of my improved Georef converter in which the same is set for the conversion of 104° 45′ West longitude —38° 50′ North latitude (the location of Colorado Springs, Colorado) to the "Georef" designations of FJAJ 1550.

Figure 2 is a view showing the combined longitude, latitude and Georef code letters and numbers indicia minutes in elevation on the slide bars in the same position as shown in Figure 1, but with the main support or mounting means in dotted lines.

Figures 3, 4:
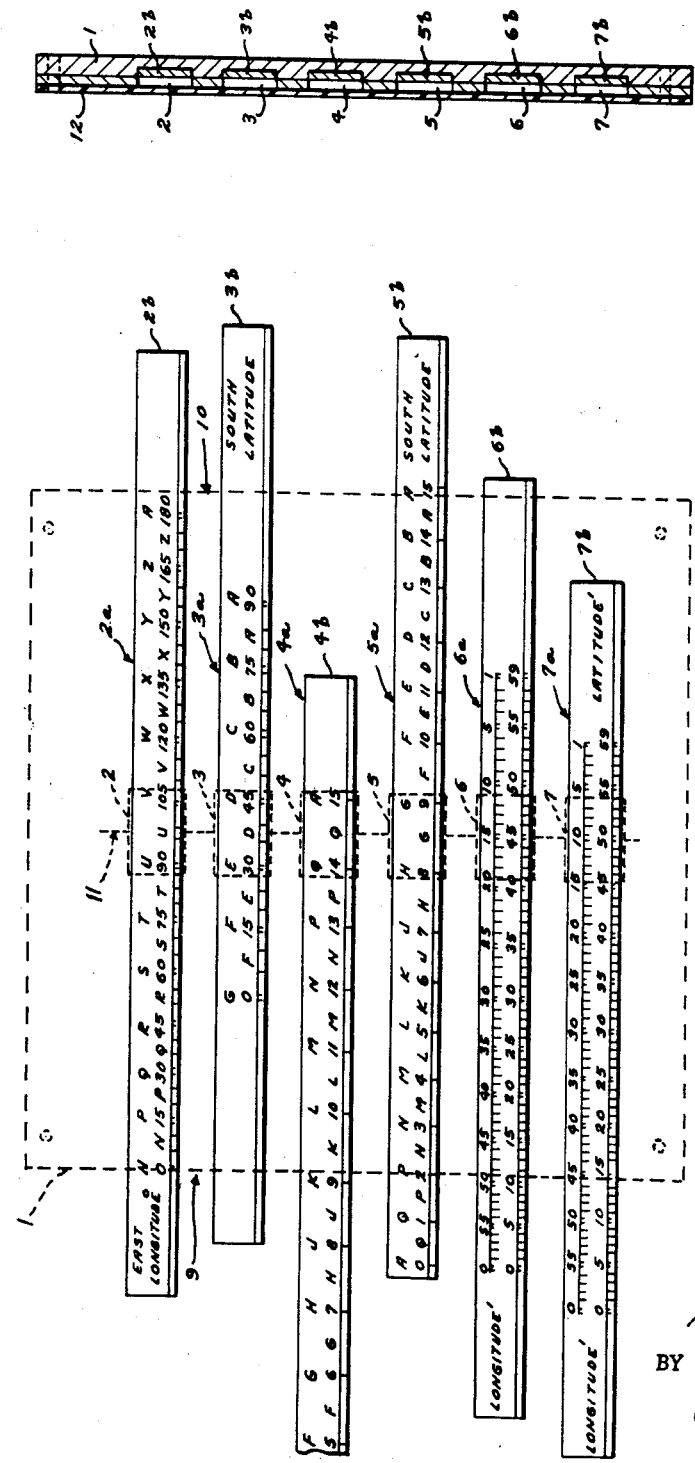
Figure 3 is a view similar to Figure 2 but with the 15° quadrangle and the 1° quadrangle, Georef converter slides turned over for conversion of East longitude and South latitude locations to Georef designations.
Figure 4 is a sectional view taken about on 4—4 of Figure 1.

In the drawing the reference numeral 1 denotes a main support or body, preferably of rectangular shape and having six windows therein indicated at 2, 3, 4, 5, 6 and 7. The body 1 is formed with guide passages extending from the left side 9 of the body under the window openings to the right side 10 of the body. These guide passages are indicated at $2^a$, $3^a$, $4^a$, $5^a$, $6^a$ and $7^a$ and each receives one of the elongated conversion data slide bars or converter members $2^b$, $3^b$, $4^b$, $5^b$, $6^b$ and $7^b$. These members $2^b$ to $7^b$ are slidable back and forth in the respective openings $2^a$ to $7^a$ to display longitude and latitude and corresponding Georef location data under a "lubber" line 11 which extends from top to bottom across the centers of the windows 2 to 7.

Preferably a transparent closure or face plate extends across the body 1 and forms a transparent closure for the window opening and a foundation for the lubber line 11 and other data.

The first and third slide bars $2^a$ and $4^a$ relate to the 15° and 1° quadrangles of longitude and the fifth bar $6^b$ relates to corresponding minutes of longitude in each degree. The first and third bars are invertable one side being used for West longitude and the other side having corresponding Georef and East longitude indicia thereon. Since on conventional maps and charts locations are given in degrees and minutes in West longitude or in East longitude and the Georef quadrangles are always coded eastward from the 180° meridian or eastward from the Western border of the 15° and 1° quadrangles one side of the bar is coded for proper Georef zone identification for West longitude while the other side is coded for proper Georef zone identification for East longitude locations.

The fifth bar $6^b$ carries two side-by-side scales the upper scale for Georef minutes identification for minutes in West longitude, in which minutes on "Georef" are in effect the reciprocal on the basis of 60 since minutes in West longitude are read right to left on conventional maps while minutes Georef are always left to right, or west to east in either hemisphere. For instance 45 minutes West longitude is 15 minutes "Georef." The lower scale of bar $6^b$ is for minutes of arc in East longitude and is read direct as indicated for conversion of minutes in East longitude to Georef minutes, both being read west to east.

The second and fourth bars $3^b$ and $5^b$ are for conversion of degrees in North and South latitude to Georef 15° and 1° quadrangles in the Georef system and vice versa. The sixth bar or slide $7^b$ is for conversion of conventional minutes of arc latitude to minutes "Georef" and this latter slide $7^b$, like the slide $6^b$, is also provided with upper and lower scales of minutes of arc. It is recalled in the conventional mapping system in North and South latitudes the minutes start from the equator and the number of each parallel of latitude increases northward in the Northern hemisphere (North latitude), and also increases southward from the equator in the Southern hemisphere (South latitude), while in the "Georef" system minutes are always read northward from the South Pole and from the southern border of each fifteen or 1° quadrangle.

The lower scale on slide bar $7^b$ is therefore numbered for minutes of arc for conventional latitude either North or South and for Georef minutes in the Northern hemisphere while the upper or reciprocal scale is for corresponding minutes on the Georef system where the location is South latitude. The latitude slide bars $2^b$ and $4^b$ are invertable having corresponding Georef and degree conversion information on one side for locations in the Western hemisphere (West longitude) and the other side for locations of the 15° and 1° quadrangles in the Eastern hemisphere (East longitude). It is recalled that in the Georef system the degrees of longitude are always located eastward from the 180° parallel or eastward from the western border of the 15° quadrangles, while in conventional longitude they are located east or west from the Greenwich meridian.

The two slides $3^b$ and $5^b$ are also invertable for conversion of degrees in North latitude or degrees in South latitude to corresponding Georef (latitude) designators and vice versa.

Here again the twenty-four Georef reference letters of the alphabet (omitting I and O) indicating the 15° quadrangles are read Eastward from the 180° meridian back to the 180° meridian while the conversion is either Eastward or Westward on conventional longitude from the 0° or Greenwich meridian. Therefore the conventional degrees on the slide $1^b$ reads left to right (West to East) from 0° to 180° and the corresponding Georef letters read right to left A to N from 180° meridian. The other side of the slide, for East longitude reads from 0° east to 180° left to right, however the Georef letters start with the letter N for 0° longitude and read left to right N to Z back to A for the 180° meridian. One side of the slide is therefore used for West longitude and the other side for East longitude.

The third slide covers the individual degrees in each of the 15° longitude quadrangles, using fifteen letters A to Q omitting I and O. On one side for West longitude the degrees are read right to left or East to West and since the Georef letters are read West to East each arc between 14° and 15° is assigned the letter A, the arc of longitude Georef between 13° and 14° is assigned the letter B etc. The other side for East longitude is reversed, the arc between 0° and 1° in each 15° quadrangle is assigned the letter A, while between 1° and 2° is assigned B reading left to right or west to east etc.; finally the arc of longitude between 14° and 15° in each 15° quadrangle of East longitude is assigned the letter Q.

The second slide bar $3^b$ is provided with six 15° of latitude division on each side; one side being for North latitude, in 15° bands from 0° for the equator to 90° at the North Pole and lettered G for arc from 0° to 15°, H for 15° to 30°, etc., northward to M for 75° to 90° North latitude.

The other side for South latitude being lettered A for 75° to 90°, B for 60° to 75° etc., northward to 15° to 0° is indicated at F.

The fourth slide bar $5^b$ like the bar $4^b$ is also divided into 15 divisions each indicating a 1 division in the 15° latitude divisions on both sides, one side for North latitude being lettered A to Q (omitting I and O) south to north, 0 to 1° represented by A, 1° to 2° as B etc., 14° to 15° being represented by Q. Being North latitude both conventional and "Georef" are read south to north (from equator to North Pole).

The other side is for South latitude and since these degrees are read South from the equator while corresponding Georef degrees are read northward. 15° to 14° is referenced as A, 14° to 13° as B etc., and finally 1° to 0° is referenced Georef as Q.

For better reference the first, third and fifth slide bars $2^b$, $4^b$ and $6^b$ for converting longitude to Georef references are indexed for longitude on the left hand ends while the second, fourth and sixth slide bars $3^b$, $5^b$, and $7^b$ are referenced on their right hand ends for latitude.

On the face plate 10 the lower two windows 6 and 7 are references for the upper scales of the bars $6^b$ and $7^b$ as West Georef longitude and South Georef latitude while the lower scales of the two bars $6^b$ and $7^b$ are respectively references for East Georef longitude and North Georef latitude. The lower scales on both bars $6^b$ and $7^b$ are divided into 60 minutes, East or West for the longitude and North or South for the latitude. Minutes Georef for East longitude are identical for each 1° quadrangle. Likewise, Georef minutes for minutes of North latitude on each 1° quadrangle are identical. However, minutes of West longitude or minutes of South latitude are reciprocals, on the basis of 60, relative to minutes Georef in the Western hemisphere or in the Southern hemisphere.

In making the conversion from conventional latitude and longitude to Georef the letters under the lubber line are read directly and consecutively downward through the windows 2, 3, 4 and 5. Then if the conversion is from West longitude the upper scale on the fifth slide 6ᵇ is used and the upper scale on the sixth bar 7ᵇ is used when converting to Georef from South latitude.

The lower scales of the two bars 6ᵇ and 7ᵇ are always used to set up the minutes longitude or latitude, East or West, or North or South, however, the lower scales are referenced for Georef conversion when the minutes are in East longitude or in North latitude.

Taking the location of Colorado Springs, Colorado USA which on the conventional map is 104° 45′ West 38° 50′ North and converting to Georef the location is West longitude and North latitude and therefore the slide bars 2ᵇ, 3ᵇ, 4ᵇ and 5ᵇ must be inserted with the sides 2ᵇ and 4ᵇ marked West longitude facing the windows 2 and 4, also the sides of the two slides 3ᵇ and 5ᵇ marked North latitude must face the windows.

If the location was East longitude the two slides 2ᵇ and 4ᵇ would be inverted, also if the location was South latitude the two slides 3ᵇ and 5ᵇ would be inverted as should be clear from the above.

On the first slide 2ᵇ it will be noted that 104° W is between 90° and 105° (the major 15° division in "Georef"). The slide 2ᵇ is shifted to dispose 90° to 105° under the window 2 which disposes the letter F under the lubber line 11.

Next the degrees necessary to bring 90° W to 104° W 14°+ so the third slide is shifted to dispose the numbers 14° to 15° under the window and the Georef corresponding letter A is noted. This is the number of 1° divisions eastward past the western meridian of the major 15° Georef quadrangle F indicating 90°–105°.

Next the fifth slide 6ᵇ is moved, noting the minutes on the lower scale thereof until 45 minutes appears in the window 6 under lubber line 11 and since the location is minutes of arc West longitude the number 15 on the upper scale is noted. Thus longitude 104°–45′W is F–A15 Georef.

Next the latitude (38° 50′ North) is converted to Georef by moving the second slide 3ᵇ to dispose the 30° to 45° under the window 3 (30° to 45° N includes 38° 50′ N). The corresponding Georef letter J is noted.

Next the fourth slide 5 is moved to dispose the number of degrees which added to 30° equals the required 38° and the Georef opposite 8° is noted as J in the window, between 8° and 9° W. Thus 38° N latitude is JJ.

Next the sixth or minutes latitude bar is shifted to dispose the remaining 50° under the lubber line 11 as noted on the lower scale. Since North latitude and the Georef minutes are both read northward the lower scale is used for minutes Georef, or it is 50′ Georef. Thus latitude 38°–50′ N is read as JJ50.

The above involves only the setting of the scales to dispose the proper conversion letters and numbers under the windows 2, 3, 4, 5, 6 and 7.

Since in the Georef system the first letter indicates the 15° longitude zone, the second the 15° latitude, the third the number of degrees within the selected 15° longitude zone, the fourth the number of degrees within the selected 15° latitude zone while the fifth number indicates the number of minutes in the selected 1° longitude zone and the sixth letter the number of minutes within the selected 1° latitude zone the letters and numbers are read through the windows consecutively downward from window 2 through window 7 or FJAJ1550 which is the proper conventional Georef location for Colorado Springs, Colorado (USA).

Assuming the location desired for conversion from latitude and longitude to Georef was 104° 45′ East 38° 50′ South, the first four slides 2ᵃ to 5ᵃ would be inverted, as seen in Figure 3. Adjusting of the slides 2ᵇ, 4ᵇ and 6ᵇ as before, using the lower scale on slide 6ᵃ for both minutes of arc east and Georef minutes (since both are measured West to East in East longitude) the letters TQ45 appear in windows 2, 4 and 6.

Similarly adjustment of the slides 3ᵇ, 5ᵇ and 7ᵇ for 38° 50′ S discloses the letters D.G.10. The upper scale on slide 7ᵇ is used for Georef minutes since in the Southern hemisphere minutes of arc are measured southward as shown on lower scale while minutes of arc Georef are measured northward and therefore appear on the upper scale as reciprocals of the lower scale minute designation, on the basis of sixty minutes. The letters D.G.10 appear in the windows 3, 5 and 7.

Now reading consecutively downward through the windows 2, 3, 4, 5, 6 and 7 the location Georef is directly obtained as TDQG45.10.

When it is desired to convert from Georef to latitude the process is, of course, reversed.

Starting with longitude the first scale bar shifted to dispose the letter T in the window 2 which indicates 90° East. Next the second bar is adjusted to D, the third at Q, the fourth at G, the fifth slide using bottom scale for minutes longitude at 15 and the sixth at 10.

Now reading downward the first, third and fifth numbers UQ45 disclose 90°+14°+45′ or 104° 45′ E while setting the letters D.G. and 10 under the windows 3, 5 and 7 the degrees and minutes noted are 30°+8°+50′ or 38° 50′ S.

From the above with reference to the drawings it will be apparent that a new and very simple and novel device has been effected for very rapid and accurate conversion of degrees and minutes East or West longitude and North or South latitude to corresponding Georef Map locations anywhere in the world.

Having thus described the invention,

I claim:

1. A Georef and longitude and latitude converter for directly converting degrees and minutes of longitude and latitude anywhere on the earth's surface to conventional Georef designations comprising a substantially rectangular flat body having top and bottom edges and left and right side edges, said body having a plurality of spaced parallel guide passages extending therethrough between said side edges, a similar number of window openings formed in said body opening forwardly from each of said guide passages intermediate said side edges, a lubber line extending across said window opening in a direction perpendicular to said guide passages, a flat elongated invertable slide, slidable in each of said guide passages behind the associated window opening and extending outwardly beyond said side edges of said body for slidably manipulating the slides in said guide passages, said latitude, longitude and Georef conversion device having at least four of said parallel guide passages, associate windows, and slide for converting only number of degrees East or West longitude and North or South latitude to 15° and 1° Georef quadrangle designators comprising an upper or first guide passage and a first invertable slide therein having one side thereof divided longitudinally into twelve equal divisions denoting intervals of 15° reading left to right 0° to 180°, said divisions lettered consecutively right to left A to M inclusive, omitting the letter I, for denoting intervals of 15° West longitude and corresponding Georef letter designators, said first slide having the opposite side thereof divided longitudinally into twelve equal divisions denoting intervals of fifteen degrees East longitude reading left to right 0° to 180° and lettered consecutively left to right M to Z omitting the letter O, for denoting 15° intervals of East longitude and corresponding Georef letter designators, a second guide passage and second invertable slide adjacent to and below said first slide having one side thereof divided longitudinally into six equal divisions denoting intervals of 15° North latitude, reading left to right, 0° to 90° and lettered consecutively left to right G to M omitting the letter I, said second slide having its opposite side divided longitudinally into six equal divisions denoting 15° intervals of South latitude lettered consecutively right to left A to F, a third guide passage below said second guide passage having a third invertable slide therein, having one side thereof divided longitudinally into fifteen equal divisions of 1° each consecutively numbered left to right 1 to 15, denoting fifteen 1° divisions of West longitude and consecutively lettered right to left A to Q, omitting letters I and O, said third slide having the opposite side thereof divided longitudinally into fifteen equal divisions of 1° each consecutively numbered left to right 1 to 15 denoting fifteen 1° divisions of East longitude consecutively lettered left to right A to Q, omitting letters I and O, said fourth slide having its opvertable slide therein adjacent to and below said third slide, having one side thereof divided longitudinally into fifteen equal divisions consecutively numbered 1 to 15 left to right denoting fifteen 1° divisions of North latitude and consecutively lettered left to right A to Q, omitting letters I and Q, said fourth slide having its opposite side divided longitudinally into fifteen equal divisions numbered 1 to 15 left to right, denoting fifteen 1° divisions of South latitude consecutively lettered right to left, A to Q omitting letters I and O, whereby adjustment of said first and third slides to indicate a predetermined longitude under the lubber line, East or West depending upon which side of the slide is facing toward the windows and adjustment of the second and fourth slides to indicate a predetermined latitude North or South depending upon which side of the second and fourth slides face the windows, and reading consecutively downward the letters displayed on the windows under the lubber line directly convert the selected predetermined longitude and latitude into the 15° and 1° Georef quadrangle designators.

2. Apparatus as set forth in claim 1 in which said plurality of guide passages and slides include a fifth guide passage and a fifth slide therein having upper and lower parallel conversion scales thereon extending longitudinally and divided equally into sixty divisions each denoting a minute of arc in longitude, said lower scale consecutively numbered 0' to 59' left to right denoting minutes of longitude East or West and minutes in the Georef system corresponding to minutes of East longitude, the last mentioned upper scale numbered consecutively 0 to 59 right to left denoting minutes in the Georef system corresponding to minutes of West longitude, said plurality of guide passages and slides including a sixth guide passage and slide therein having upper and lower parallel conversion scales thereon extending longitudinally and divided equally into sixty divisions, each denoting a minute of arc, the latter lower scale consecutively numbered 0' to 59' right to left denoting minutes of arc in North or South latitude and corresponding minutes in the Georef designator system for minutes in North latitude, the latter upper scale reading right to left 1 to 59 denoting numbers of arc in the Georef system corresponding to minutes in South latitude displayed through the sixth window on the last mentioned lower scale.

References Cited in the file of this patent
UNITED STATES PATENTS

| | | |
|---|---|---|
| 2,834,123 | Knight | May 13, 1958 |
| 2,848,824 | Donaldson | Aug. 26, 1958 |

FOREIGN PATENTS

| | | |
|---|---|---|
| 319,981 | Great Britain | Oct. 3, 1929 |